(12) United States Patent
Pandhi et al.

(10) Patent No.: US 10,369,889 B2
(45) Date of Patent: *Aug. 6, 2019

(54) SYSTEM AND METHOD FOR PROCESSING ELECTRIC VEHICLE AND INSURANCE DATA

(71) Applicant: Hartford Fire Insurance Company, Hartford, CT (US)

(72) Inventors: Rohini H. Pandhi, San Francisco, CA (US); David F. Peak, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 146 days.

This patent is subject to a terminal disclaimer.

(21) Appl. No.: 14/145,176

(22) Filed: Dec. 31, 2013

(65) Prior Publication Data

US 2014/0121878 A1    May 1, 2014

Related U.S. Application Data

(63) Continuation of application No. 13/440,099, filed on Apr. 5, 2012, now Pat. No. 8,731,974.

(60) Provisional application No. 61/471,878, filed on Apr. 5, 2011.

(51) Int. Cl.
  *G06Q 40/08* (2012.01)
  *B60L 11/18* (2006.01)
  *G06Q 40/00* (2012.01)
  *B60L 53/00* (2019.01)

(52) U.S. Cl.
  CPC ........... *B60L 11/1809* (2013.01); *B60L 53/00* (2019.02); *G06Q 40/00* (2013.01); *G06Q 40/08* (2013.01)

(58) Field of Classification Search
  CPC ...... B60W 20/00; B60W 10/08; B60W 10/00; G06Q 10/10; G06Q 40/08; G06Q 40/00; B60L 11/1809
  USPC .............................................................. 705/4
  See application file for complete search history.

(56) References Cited

U.S. PATENT DOCUMENTS

| 5,534,759 A * | 7/1996 | Evans | ................. B60L 11/1851 180/65.1 |
| 7,188,070 B2 | 3/2007 | Dar et al. | |
| 8,290,701 B2 | 10/2012 | Mason et al. | |
| 8,595,034 B2 * | 11/2013 | Bauer | ................... G06Q 40/08 705/4 |

(Continued)

OTHER PUBLICATIONS

Hill, Brandon, "Tesla Model S to Feature 17" Center Console Display, 12.3 "Instrument Cluster", Jan. 4, 2011, DailyTech, 1 page, <http://www.dailytech.com/Tesla+Model+S+to+Feature+17+Center+Console+Display+123+Instrument+Cluster/article20559.htm>.*

(Continued)

*Primary Examiner* — I Jung Liu
(74) *Attorney, Agent, or Firm* — Howard IP Law Group

(57) ABSTRACT

Pursuant to some embodiments, insurance systems, methods and devices are provided in which electric vehicle information, including electric vehicle charging information, may be received over a communications network. The electric vehicle charging information may be automatically associated with automobile insurance premium information. An integrated presentation of the electric vehicle charging information and the automobile insurance premium information may then be transmitted, over the communications network, for presentation to an owner of the electric vehicle.

8 Claims, 12 Drawing Sheets

(56) References Cited

U.S. PATENT DOCUMENTS

| | | | | |
|---|---|---|---|---|
| 2002/0066392 | A1* | 6/2002 | Calam | B60N 2/468 108/33 |
| 2002/0177926 | A1* | 11/2002 | Lockwood | G06Q 10/20 701/1 |
| 2004/0039611 | A1* | 2/2004 | Hong | G06Q 40/08 705/4 |
| 2005/0102075 | A1* | 5/2005 | Dar | G06O 40/08 701/31.4 |
| 2005/0234627 | A1* | 10/2005 | Perach | B60K 35/00 701/71 |
| 2007/0038488 | A1* | 2/2007 | Bauer et al. | 705/4 |
| 2008/0278302 | A1* | 11/2008 | Palmer | B60K 35/00 340/441 |
| 2009/0140698 | A1* | 6/2009 | Eberhard | H02J 7/045 320/152 |
| 2010/0036599 | A1 | 2/2010 | Froeberg et al. | |
| 2010/0049610 | A1* | 2/2010 | Ambrosio | G06Q 30/02 705/14.62 |
| 2010/0057479 | A1* | 3/2010 | De | G06Q 10/20 705/305 |
| 2010/0235006 | A1 | 9/2010 | Brown | |
| 2010/0292877 | A1 | 11/2010 | Lee | |
| 2011/0125363 | A1* | 5/2011 | Blumer et al. | 701/33 |
| 2011/0130885 | A1* | 6/2011 | Bowen | B60L 3/12 700/291 |
| 2011/0153367 | A1* | 6/2011 | Amigo | G07C 5/008 705/4 |
| 2011/0224841 | A1* | 9/2011 | Profitt-Brown | B60K 35/00 701/2 |
| 2011/0231055 | A1* | 9/2011 | Knight | G07C 5/008 701/31.4 |
| 2011/0238287 | A1* | 9/2011 | Hayashi | G01C 21/3682 701/532 |
| 2011/0238457 | A1* | 9/2011 | Mason | G01C 21/3469 705/7.14 |
| 2011/0270476 | A1* | 11/2011 | Doppler | B60L 11/1816 701/22 |

OTHER PUBLICATIONS

Savov, Vlad, "Tesla Model S to have 17-inch infotainment console powered by Tegra; BMW using NVIDIA tech too", Jan. 4, 2011, Engadget, 4 pages, <https://www.engadget.com/2011/01/04/teslamodelstohave17inchinfotainmentconsolepoweredbyt/>.*

Chen, Jason, "First Look At the Tesla Model S Electric Car's Giant Touchscreen Dashboard", Mar. 26, 2009, Gizmodo, 9 pages, <http://gizmodo.com/5185966/first-look-at-the-tesla-model-s-electric-cars-giant-touchscreen-dashboard>.*

Khazzoom, J. Daniel, "Pay-at-the-Pump Auto Insurance", Feb. 2000, Resources for the Future, 46 pages, <http://www.rff.org/files/sharepoint/WorkImages/Download/RFF-DP-98-13-REV.pdf>.*

Akst, Daniel, "Paying at the Pump Makes Sense: Auto Insurance: Several Plans Would Provide Universal Coverage Via a Gasoline Tax", Apr. 6, 1993, Los Angeles Times, 2 pages, <http://articles.latimes.com/print/19930406/business/fi19683_1_californiaautoinsurancesystem>.*

Higbee, Arthur, "American Topics: Pay-at-the-Pump Plan for Car Insurance", Feb. 17, 1993, The New York Times, 1 page, <http://www.nytimes.com/1993/02/17/news/17ihttopi_34.html?pagewanted=print>.*

Thomas A. Becker, Ikhlaq Sidhu, and Burghardt Tenderich, Aug. 24, 2009, University of California, Berkeley, web, 1-20 (Year: 2009).*

* cited by examiner

| POLICY IDENTIFIER 402 | VEHICLE IDENTIFIER 404 | LAST CHARGE LOCATION 406 | LAST CHARGE DATE (TIME) AND AMOUNT 408 | VEHICLE TYPE 410 |
|---|---|---|---|---|
| P101 | EV_101 | 555 BROADWAY NEW YORK, NY | FEB. 14, 2015 (09:45 AM) 16 KWH | PERSONAL |
| P102 | BEV_227 | 123 MAIN STREET HARTFORD, CT | FEB. 14, 2015 (11:22 AM) 30 KWH | FLEET |
| P103 | PHEV_124 | 123 MAIN STREET HARTFORD, CT | FEB. 15, 2015 (6:34 PM) 25 KWH | PERSONAL |
| P104 | EV_102 | 40 WEST STREET HARTFORD, CT | FEB. 15, 2015 (12:36 AM) 40 KWH | COMMUNITY |

SYSTEM AND METHOD FOR PROCESSING ELECTRIC VEHICLE AND INSURANCE DATA

CROSS-REFERENCE TO RELATED APPLICATIONS

The present application is a continuation application of copending U.S. patent application Ser. No. 13/440,099 filed Apr. 5, 2012, entitled "Systems and Methods Associated with Insurance for Electric Vehicles," which in turn claims benefit of and priority to U.S. Provisional Patent Application Ser. No. 61/471,878 filed on Apr. 5, 2011 and entitled "Systems and Methods Associated with Insurance for Electric Vehicles", the contents of each of which are incorporated herein by reference in their entireties for all purposes.

FIELD

Embodiments relate to insurance processing systems and methods. More particularly, embodiments relate to the provision of insurance processing for electric vehicles.

BACKGROUND

The use of electric vehicles has recently increased and is expected to continue to grow in the near future. While electric vehicles may provide economic and/or environmental benefits, some drivers may have concerns regarding the use of alternative fuels. For example, the locations of charging stations, the distances that can be traveled without running out of power, and/or the appropriate maintenance schedules associated with electric vehicles may be unfamiliar to drivers. This may be especially true for drivers who are new to the electric vehicle experience. Similarly, businesses may be uncomfortable when introducing electric vehicles into an existing fleet of automobiles.

Existing automobile insurance products may provide a level of comfort to drivers with respect to personal injury costs and/or property damage (e.g., damage to an automobile in the event of an accident). It would be desirable to provide information to electric vehicle drivers and/or owners to reassure them regarding some of the new aspects associated with the technology. Moreover, more data may be available regarding the use of electric vehicles as compared to traditional gasoline powered automobiles (e.g., an electric vehicle identifier might be transmitted to a charging station). It may therefore further be desirable to provide more accurate and current data about an electric vehicle to an insurance provider and/or to a driver or owner of the electric vehicle. Further still, it may be desirable to monitor or identify driving patterns associated with certain electric vehicle drivers to allow those drivers to receive discounts or other benefits based on desirable charging patterns.

BRIEF DESCRIPTION OF THE DRAWINGS

FIG. 4 is an illustrative example of a portion of a tabular insurance database in accordance with some embodiments.

DETAILED DESCRIPTION

Embodiments of the present invention relate to systems and methods associated with insurance products for electric vehicles. While electric vehicles may provide economic and/or environmental benefits, some drivers may have concerns regarding the use of alternative fuels. For example, the locations of charging stations, the distances that can be traveled without running out of power, and/or the appropriate maintenance schedules associated with electric vehicles may be unfamiliar to drivers.

Figure 1:
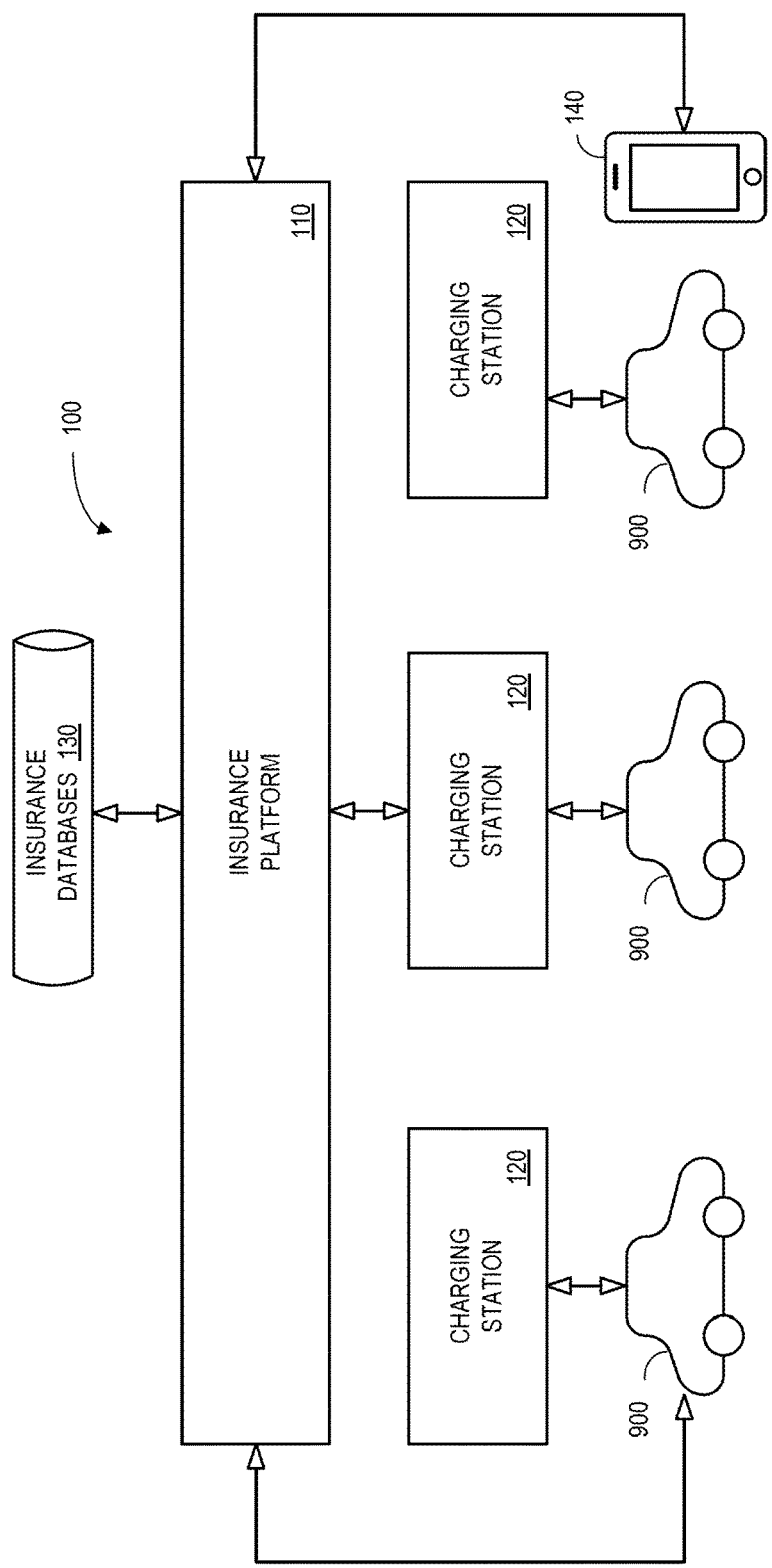
FIG. 1 illustrates an insurance system according to some embodiments.

To address such concerns, FIG. 1 illustrates an insurance system 100 according to some embodiments. In particular, an insurance platform 110 may exchange information with one or more "electric vehicles" 900. As used herein, the phrase "electric vehicle" may refer to any vehicle that is at least partially powered by electricity, including a hybrid electric vehicle, a Plug-in Hybrid Electric Vehicle ("PHEV"), or a Battery Electric Vehicle ("BEV").

According to some embodiments, the insurance platform 110 may exchange information directly with the electric vehicle 900 (e.g., via a wireless communication network). According to other embodiments, the insurance platform 110 may exchange information about the electric vehicle 900 via a charging station 120 or via a mobile device 140 (e.g., associated with a driver or payment provider). The information about the electric vehicle 900 might include, for example, a driver or vehicle identifier, a location (e.g., of a charging station), a time of day and/or date, and/or maintenance information. The insurance platform may then use the information about the electric vehicle 900 and/or information from one or more insurance databases 130 in accordance with any of the embodiments described herein.

According to some embodiments, the "automated" insurance platform 110 may transmit an integrated insurance/electric vehicle display to a driver. As used herein, the term "automated" may refer to, for example, actions that can be performed with little or no human intervention. By way of example only, the insurance platform 110 may be associated and/or communicate with a Personal Computer (PC), an enterprise server, or a database farm. As used herein, devices (including those associated with the insurance platform 110, and any other device described herein) may exchange information via any communication network, including one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Note that the insurance platform 110 may be associated with various types of insurance policies, including personal insurance, business insurance, and wealth management offerings, including property and casualty insurance, life insurance, retirement and education investment products, and group benefits offerings. Moreover, although a single insurance platform 110 is shown in FIG. 1, any number of such devices may be included. Moreover, various devices described herein might be combined according to embodiments of the present invention. For example, in some embodiments, the insurance platform 110 and insurance databases 130 might be co-located and/or may comprise a single apparatus.

Figure 2:
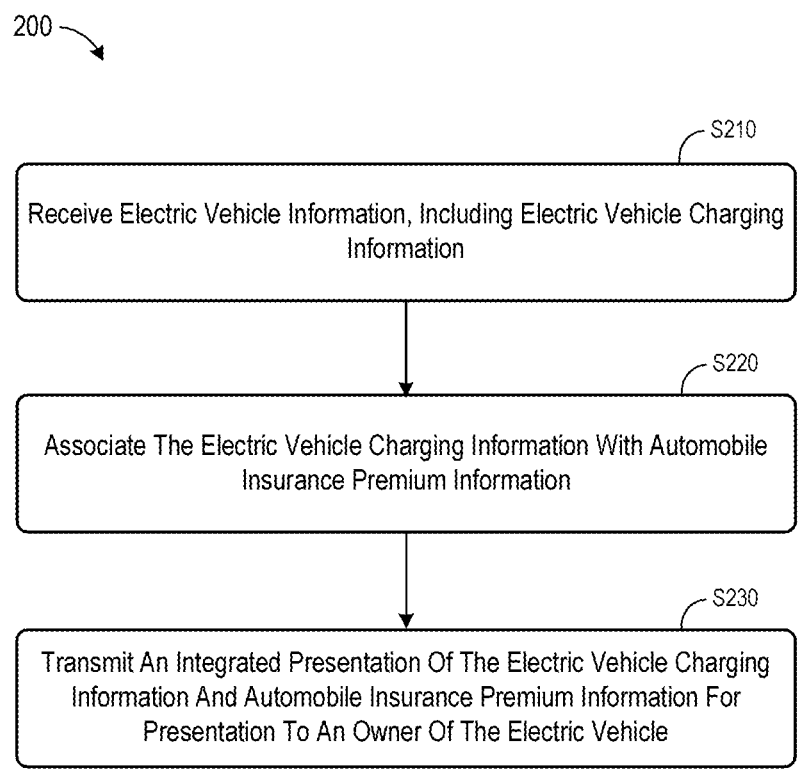
FIG. 2 is a flow diagram of a method that may be performed in accordance with some embodiments.

FIG. 2 illustrates a process 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to facilitate the distribution of information associated with insurance goods and/or services. Pursuant to some embodiments, electric vehicle information, including electric vehicle charging information, may be received at S210. The electric vehicle information may be received, for example, from an electric charging station, the electric vehicle, and/or a mobile payment device (e.g., a payment card cobranded with an insurance company). The electric charging information might, for example, include a geographic location of an electric charging station, an amount of electric charge provided for the electric vehicle, a date and time, a driver identifier, an electric vehicle identifier, an insurance policy identifier, and/or a cost associated with an electric charge provided for the electric vehicle.

At S220, the electric vehicle charging information may be associated with automobile insurance premium information. For example, an insurance platform may correlate the charging information with one or more pre-existing insurance policy identifiers. According to some embodiments, the automobile insurance premium information is associated with a fleet of electric vehicles operated by an enterprise and the automobile insurance premium information may be associated with business income interruption loss insurance. According to other embodiments, the automobile insurance premium information is further associated with maintenance information for the electric vehicle. According to still other embodiments, the automobile insurance premium information is further associated with a roadside assistance program for the electric vehicle and/or at least one shared neighborhood electric vehicle.

At S230, an integrated presentation of the electric vehicle charging information and automobile insurance premium information may be transmitted for presentation to an owner of the electric vehicle. The transmitting may be, for example, associated an electric charging station, the electric vehicle, a mobile payment device, and/or a communication address associated with an owner of the electric vehicle (e.g., a home address or email address).

Figure 3:
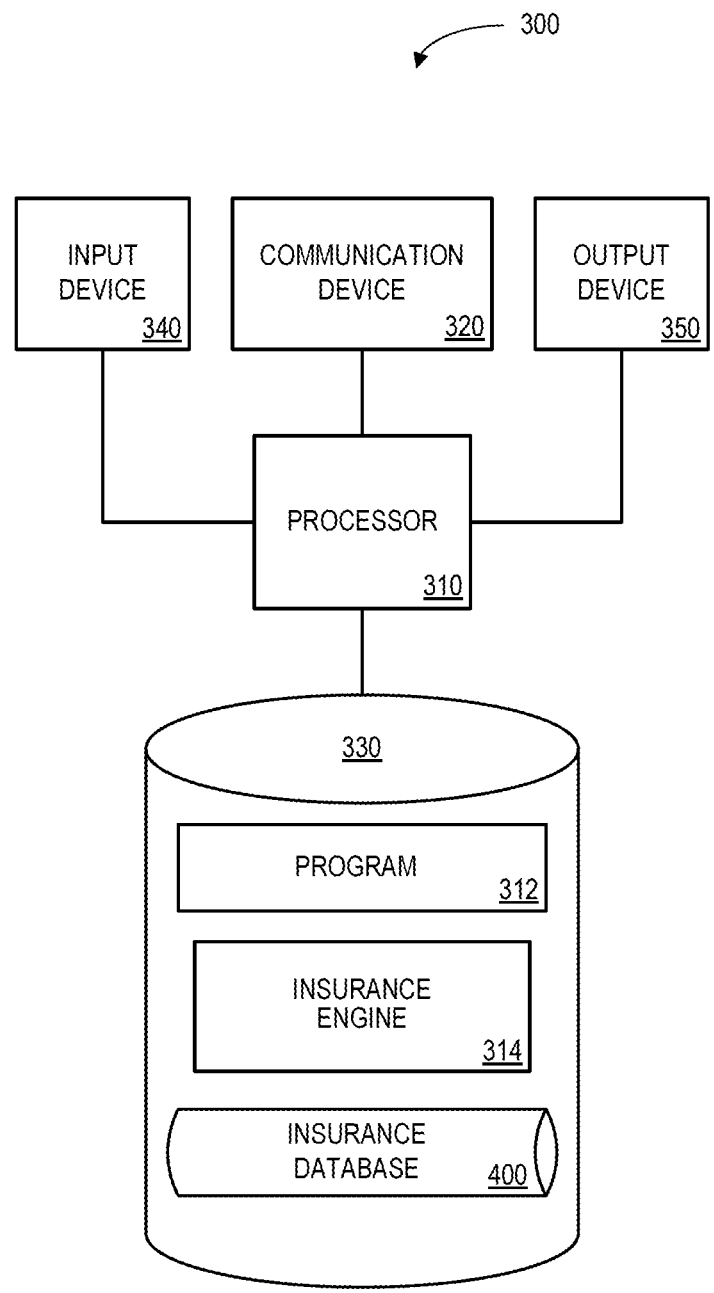
FIG. 3 is an example of an insurance platform according to some embodiments.

The process 200 of FIG. 2 may be performed by any suitable device or apparatus. FIG. 3 is one example of an insurance platform 300 according to some embodiments. The insurance platform 300 may be, for example, associated with the system 100 FIG. 1. The insurance platform 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more remote charging stations, electric vehicles, or mobile payment devices. The insurance platform 300 further includes an input device 340 (e.g., a mouse and/or keyboard to enter insurance or electric vehicle information) and an output device 350 (e.g., a computer monitor to display aggregated electric vehicle reports and/or results to an administrator).

Figure 5:
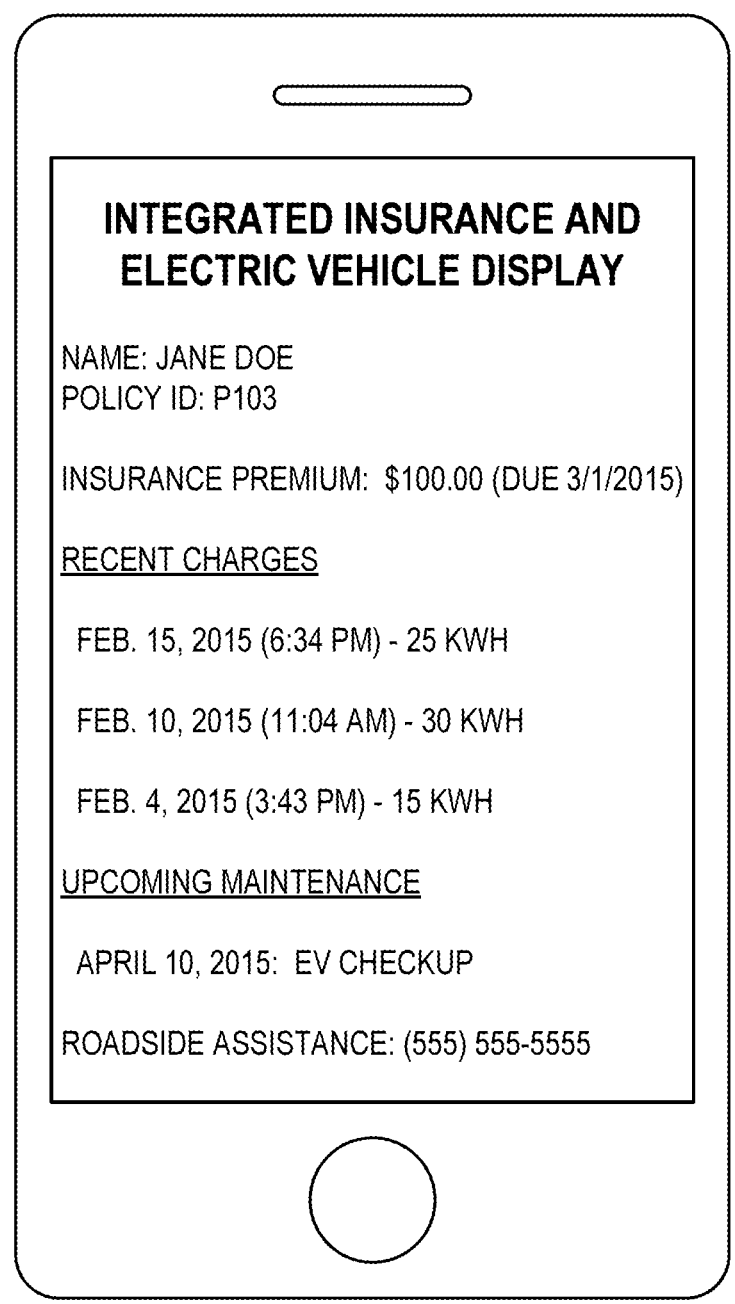
FIG. 5 is an example of an integrated insurance/charging display according to some embodiments described herein.

The processor 310 also communicates with a storage device 330. The storage device 330 may comprise any appropriate information storage device, including combinations of magnetic storage devices (e.g., a hard disk drive), optical storage devices, and/or semiconductor memory devices. The storage device 330 stores a program 312 and/or insurance engine 314 for controlling the processor 310. The processor 310 performs instructions of the programs 312, 314, and thereby operates in accordance with any of the embodiments described herein. For example, the processor 310 may receive electric vehicle information, including electric vehicle charging information. The processor 310 may then associate the electric vehicle charging information with "automobile insurance premium information." The automobile insurance premium information may be associated with, for example, any type of insurance product offered for an electric vehicle. The processor 310 may then transmit, over the communications network, an integrated presentation of the electric vehicle charging information and the automobile insurance premium information for presentation to an owner of the electric vehicle. For example, FIG. 5 illustrates an integrated insurance/charging display 500 for driver "Jane Doe" according to some embodiments described herein.

Referring again to FIG. 3, the programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the insurance platform 300 from another device; or (ii) a software application or module within the insurance platform 300 from another software application, module, or any other source.

In some embodiments (such as shown in FIG. 3), the storage device 330 stores an insurance database 400. An example of a database that may be used in connection with the insurance platform 300 will now be described in detail with respect to FIG. 4. Note that the database described herein is only one example, and additional and/or different information may be stored therein. Moreover, various databases might be split or combined in accordance with any of the embodiments described herein.

Referring to FIG. 4, a table is shown that represents the insurance database 400 that may be stored at the insurance platform 300 according to some embodiments. The table may include, for example, entries identifying insurance products that may be offered in connection with electric vehicles. The table may also define fields 402, 404, 406, 408, 410 for each of the entries. The fields 402, 404, 406, 408, 410 may, according to some embodiments, specify: a policy identifier 402, a vehicle 404, a last charge location 406, a last charge date/time and amount 408, and a vehicle type 410. The information in the insurance database 400 may be created and updated, for example, whenever data is received from remote insurance agent devices and/or charging stations.

The policy 402 may be, for example, a unique alphanumeric code identifying an insurance product for a particular electric vehicle and/or driver. The vehicle identifier 404 may be, for example, associated with a particular electric vehicle and may, for example, corresponding to an identifier received from a charging station or payment device. The last charge location 406 might, for example, be an address or other geographic code indicating where the electric vehicle received a charge. Although a single charge is illustrated in FIG. 4, in actually a log of charges would likely be maintained in the database 400.

The last charge date/time and amount 408 may indicate when the charge was provided to the electric vehicle along with the cost of the charge. According to some embodiments, payments associated with the insurance policy and payments associated with electric charges may be merged or otherwise combined. For example, a driver might make a small insurance payment each time he or she charges an electric vehicle via a single payment platform (e.g., credit card or utility bill payments).

The vehicle type 410 may indicate, for example that the insurance policy is associated with a personal vehicle, a fleet of electric vehicles, or a shared neighborhood or community vehicle.

In the case of a personal insurance policy, an insurance provider-branded payment card (e.g., associated with a charging station) might provide electric vehicle drivers with auto insurance along with other value-added services. For example, a driver might swipe a single card to charge an electric vehicle at home and at public stations that are part of the CHARGEPOINT® electric charging network. The card may have the option to be pre-loaded so that drivers can pay-by-the-charge. Thus, every time a driver "fills up" an electric vehicle, he or she can simply deduct a pre-determined amount that shows up on the monthly insurance bill. For drivers that use such a pre-pay option, additional benefits may be available (e.g., for free "fill ups") based on driving habits, loyalty, etc.

According to any of the embodiments described herein, an insurance policy and/or electric vehicle may be associated with a preferred access to a charging station. For example, a driver might use a mobile phone application to reserve a spot at a particular charging station and/or at a particular date and time.

In addition to bundling insurance and vehicle charging information in such a package, an insurance provider might also offer other services to electric vehicle drivers. For example, if a driver is stranded due to charge depletion in their electric vehicle, he or she might call a pre-approved roadside assistance number provided on the back of the payment card. The phone number might coordinate a service truck to either complete a quick charge of the vehicle or tow the vehicle home to charge at a convenient location. The card may also provide drivers with access to other electric vehicles drivers through an online "green" community as well as electric vehicle experts at pre-certified maintenance shops. Moreover, the insurance provider might offer branded "loaner cars" (e.g., for five days a year) via a car rental or car sharing company. These loaners might, for example, be used when a driver wants to make a long trip.

According to some embodiments, the driver's auto insurance, vehicle charges, maintenance, and roadside assistance may all be captured transparently on a single bill from an insurance provider. In some embodiments, an insurance provider might interact with a driver at a point of sale. For example, when a driver buys an electric vehicle, he or she may be provided with marketing material describing a "Complete EV Package" option. If the driver signs up to be insured by the provider, they might also receive a co-branded charging card that can be used immediately at any CHARGEPOINT® electric charging station.

By simplifying the process and attracting early electric vehicle adopters, the insurance provider may strengthen its brand with drivers. Additionally, by providing an option to pay for charging by the mile, the provider may obtain location information about where the car is located during the day (based on where the driver charges) and/or how many miles are driven, for potential risk assessment. As an additional benefit, "cash back," free charge-ups, and/or additional benefits may be provided for free each year a driver is not in an accident.

By way of example, a driver might consider purchasing a new zero emission electric vehicle. The driver is interested in the vehicle, but still has some range anxiety and is unfamiliar with the maintenance process, charging infrastructure, and billing in the electric vehicle ecosystem (including changes to his auto insurance policy). Such a driver may be interested in having a "one-stop shop" where he or she can have all of his electric vehicle services maintained by a single company.

In addition to personal automobile insurance policies, some embodiments described herein may be associated with business policies, such as those covering a fleet of vehicles. In this case, an insurance provider may offer an add-on option for business automobile policies that have electric vehicles within their commercial fleets. For example, a business owner might purchase an add-on to their current auto insurance coverage that provides them with specialty coverage in connection with their electric vehicles. The optional policy might not only give them standard business income interruption loss coverage, but also provide rental reimbursement and delivery, maintenance servicing for towing, vehicle charging or infrastructure fixes, and or property damage coverage if the charging stations or car batteries cause damage to a building or vehicle.

According to some embodiments, a co-branded charging card package may provide fleet/business managers with a phone service line that will take care of interruption losses, streamline the process of getting to approved rental agencies (e.g., agencies that will drive rental cars to the business location), and/or schedule towing or maintenance appointments on-site (e.g., to conduct fast charges of vehicles or to update infrastructure components).

By way of example, a fleet manager at a delivery service business decides to convert some of his or her old fleet of light-trucks to electric vehicles. The manager knows that the total range of his or her drivers is unpredictable at times, but each driver definitely travels less than 50 miles per day. Such a manager may be less worried about the range of the new electric vehicles (especially if the business has charging stations at the warehouse for nightly fill-ups). The manager still may be concerned, however, about business income interruption losses in the event that the charging stations break, there is a power outage, and/or the vehicle batteries fail to function properly. Since deliveries still need to be made in these situations, the security of the services described herein may be useful.

According to other embodiments, free or reduced cost electric vehicle products (e.g., a car and a charger) might be provided to certain target demographic members. For example, an insurance provider may offer additional electric vehicle services and products for drivers that become insured with a particular electric vehicle auto policy. Specifically, the provider may offer certain drivers (e.g., retirees living at a particular retirement community, college students living on campus, or customers of a shared vehicle program such as the ZIPCAR® car rental service) an integrated billing system that includes existing insurance policies (if any), a new discounted policy for a neighborhood electric vehicle, and an electric 'fill-up' for the community electric vehicle on a monthly basis. A co-branded charging station may allow drivers to swipe a key card for "fill ups." These charges may be wrapped together with the driver's automobile insurance in a monthly statement from the insurance provider. Additional features and services might also be provided for safer drivers.

By way of example, an older couple may live in a retirement community with other retirees. Even though they are retired, they have an active lifestyle and may be interested in a vehicle to travel around the community. In this case, a shared neighborhood electric vehicle may be provided for the entire community. By using the insurer-provided charging station and electric vehicle, the community may also be provided with an integrated billing system that includes a club membership, auto insurance, and/or monthly vehicle charging fees.

Figure 6:
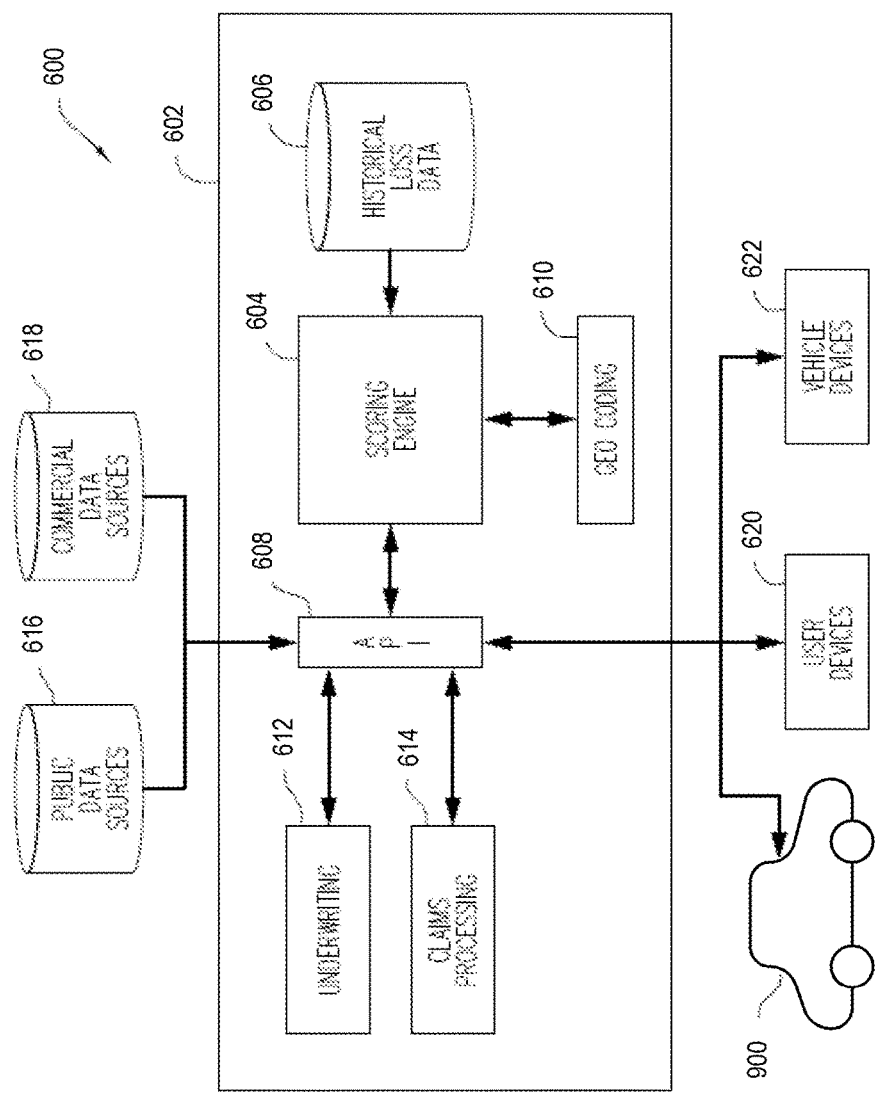
FIG. 6 illustrates a system architecture within which some embodiments may be implemented.

Note that according to some embodiments, the location of an electric vehicle and/or an amount of travel associated with an electric vehicle may be determined based on information about when and where the electric vehicle is charged. Further note that such information may be helpful when determining insurance risk factors associated with the vehicle. For example, features of some embodiments will now be described by first referring to FIG. 6, where a network 600 for providing electric vehicle insurance information pursuant to some embodiments is shown. As depicted, network 600 includes a number of devices which together operate to generate, store and utilize loss risk scores for use in informing drivers and in insurance processing. Network 600 includes an insurance processing system 602 with a scoring engine 604 that generates loss risk scores that may be provided to a number of drivers, such as drivers operating electric vehicles 900 (such as those described in conjunction with FIG. 9), other user devices 620 (such as personal computers, mobile phones, or the like), and vehicle devices 622 (such as charging stations, navigation systems or the like). The loss risk scores may be associated with driver or vehicle behavior (e.g., to identify driving patterns which present a relatively low or high risk) and/or insurance premiums.

Data may be provided from electric vehicles 900, user devices 620 and vehicle devices 622 (e.g., including charging stations) to update data used by the scoring engine 604 to improve the accuracy and relevancy of scoring data. Pursuant to some embodiments, insurance processing system 602 includes a scoring engine 604 which operates on historical loss data 606 and loss-related data from other data sources (such as public data sources 616 and commercial data sources 618) to generate loss risk scores that indicate a relative loss risk. In some embodiments, the loss risk scores (and data used to generate the loss risk scores) are geocoded to create a loss risk index that represents the relative risk of loss in different geographical locations. Pursuant to some embodiments, address and location data may expressed (or "geocoded") as a location (or "geocode") given in latitude and longitude, using standard decimal degrees notation for the latitudes and longitudes, although other spatial and locational data may also be used to code and tag data associated with the present invention.

In some embodiments, the geocoding or tagging may include identifying specific types of locations, such as electric vehicle charging stations, or the like so that loss risk scores and other information may be associated with those locations. In some embodiments, system 602 includes a geocoding engine 610 which operates on received data to express the data as a location. For example, the geocoding engine 610 may be used on address data received from an insurance application, claim or other information and translate or express the address as a latitude and longitude. The engine 610 may also append other location-related data to the address data to provide additional location information to the data. The "geocoded" data may then be stored, used as an input to the scoring engine 604, or presented to a user device (e.g., such as an electric vehicle 900, etc.) for use (e.g., such as by presenting the data in a map format or overlay).

Any of a number of different algorithms may be used to generate the loss risk scores and the loss risk index. In some embodiments, the historical loss data 606 and other input data sources 616, 618 are selected based on variables that have a high correlation to loss. The loss risk scores and the loss risk index may be generated using statistical modeling techniques such as by performing computations using discrete scores that are weighted in nonlinear combination (e.g., such as based on the likelihood of a loss in a given geographical location or geocode). In some embodiments, the generation of the loss risk scores and index may be performed by sampling data (including historical loss data 606), normalizing the data, generating a scoring model and verifying and updating the model. In some embodiments, the model may be updated based on actual loss data received from mobile devices and from other sources. In some embodiments, the scoring may be shared among a number of insurance entities (e.g., such as a consortium or group of insurance companies) and historical and current loss data may be provided from those entities to create a more accurate and predictive score.

As a specific example (which is provided for illustration but not limitation), the system of the invention operates on data to generate loss risk scores that are associated with the likelihood of an electric vehicle loss. In such an example implementation, the following types of data may be used as inputs to the scoring engine: (i) data from historical loss data 606 including historical data associated with collision losses, historical data associated with theft losses, and historical data associated with personal injury losses, (ii) data from public data sources 616, including census and demographic data (e.g., such as population density, crime statistics, emergency call data, highway and road construction data), and (iii) data from commercial data sources 618 (e.g., such as data from other insurers regarding losses, theft data from sources such as LOJACK® anti-theft system or ONSTAR® vehicle information system, and traffic and traffic density data from sources such as EZ-PASS® highway toll payment system or the like). This data may further be enhanced or updated using data from users operating electric vehicles 900, other user devices 620 and vehicle devices 622 (e.g., such as electric vehicle charging stations).

A number of algorithms may be used to generate loss risk scores pursuant to some embodiments. As one illustrative (but not limiting) example, a loss risk score may be calculated using the following general function:

Loss Risk Score=$aP \times bQ \times cS \times dT \times eU \times fV$

Pursuant to some embodiments, the function generates a Loss Risk Score which is a score for a specific location or geocode associated with a charging station. The Loss Risk Score may be a representation of a general loss risk range. For example, in some embodiments, loss risk tiers may be represented as color codes, such as "green" for low risk, "orange" for normal risk, and "red" for higher risk. As another example, the loss risk tiers may be represented as alphabetical grades or scores (e.g., such as "A" for low risk, "B" for normal risk, and "C" for higher risk). Other representations may include tiers based on percentages, or other representations of the relative risk of a geocode or location.

In the formula depicted above, the variable "P" represents the Average Claims or Loss Severity for a particular geocode or area associated with a charging station. The variable "Q" represents the Average Claims or Loss Frequency for that geocode or area. The variable "R" represents a Weather Risk factor (e.g., representing adverse weather conditions, such as a snowstorm, rain storm, hurricane, etc.), and the variable "S" represents a Time of Day risk factor (e.g., associated with a time of day, such as rush hour, night time, etc.) The variable "T" represents a Day Risk Factor (e.g., such as a particular day of the week, holiday, etc.), and the variable "U" represents a Traffic Condition Risk factor (e.g., such as a current traffic condition for a particular geocode or location). The variable "V" represents a User Generated risk factor (based on, for example, inputs received from people reporting or identifying dangerous events or conditions using their mobile devices). The variable "W" represents a Crime Risk factor (e.g., such as a risk of car thefts or property damage). The variable "Y" represents a People or Vehicle risk factor (e.g., based on population density information). Those skilled in the art will appreciate that other variables and inputs may be provided to generate a risk score that has a high correlation to the risk of loss in a particular location or geocode associated with a charging station. Each of the variables may be based on data received substantially in real time from a number of different sources. Individual risk factors will only be used in applicable jurisdictions as allowed by law.

Pursuant to some embodiments, an Electric Vehicle or Person Risk score may also be calculated using a formula such as the following:

Electric Vehicle or Person Risk Score=$m\% \times A + n\% \times B + p\% \times C$ Where the Electric Vehicle or Person Risk Score is a score for a particular person or electric vehicle (or group of persons or electric vehicles) over a period of time based on cumulative trips taken during that period of time. For example, a person who, during the course of the year 2015, spends much of their time charging his or her electric automobile at high risk geocodes may be assigned a Person Risk Score of "red" (or some other indicator of high risk) based for 7010. In the Electric Vehicle or Person Risk Score formula shown above, the variable m % is the percentage of the total distance taken through or in geocodes having a Loss Risk Score of "A" (low risk), n % is the percentage of the total distance taken through or in geocodes having a Loss Risk Score of "B" (normal risk), and p % is the percentage of the total distance traveled in or through geocodes having a Loss Risk Score of "C" (high risk).

Each of these risk scores may be used in providing information to users operating electric vehicles as well as in providing insurance services, including in the pricing and underwriting of insurance policies. In some embodiments, the risk scores may be generated and used by an insurance processing system 602.

Insurance processing system 602 may be operated by, or on behalf of, an insurance company that issues insurance policies associated with the type of risk scored by the scoring engine 604. For example, in the situation where the scoring engine 604 is used to score vehicle or automobile types of loss risks, the insurance processing system 602 may be operated by an automobile insurer. In some embodiments, some or all of the components of the system 602 may be operated by or on behalf of other entities. For example, in some embodiments, the system 602 may be operated by a device manufacturer (e.g., such as an electric vehicle manufacturer, etc.) in order to provide risk and driving related data to their drivers. In some embodiments, some or all of the system 602 may be operated by agents or other groups or entities in order to provide, use, and otherwise interact with scoring and driving data pursuant to the present invention.

Data generated by the scoring engine 604, or received from electric vehicles 900, user devices 620 and/or vehicle devices 622 may be used by the insurance processing system 602 to perform policy underwriting (e.g., using underwriting systems 612) and/or claims processing (e.g., using claims processing systems 614). For example, as will be described further below, automobile insurance policyholders who suffer an accident and need to submit a claim on their policy may submit claim data to the insurance processing system 602 (e.g., to trigger a notice of loss or otherwise initiate claims processing). The data received by the insurance processing system 602 may be received via one or more application programming interfaces (APIs) 608 and routed to the claims processing systems 614 for processing. In some embodiments, the data may also be routed to the scoring engine 604 to update loss risk data (e.g., to provide data about the accident, the location and the nature of the claimed loss).

Pursuant to some embodiments, the API 608 may include one or more APIs that expose some or all of the scoring data to external services. For example, in one embodiment, an API may be provided that allows the scoring data to be merged or integrated with data from external mapping services, such as GOOGLE® Maps mapping service, or MAPQUEST® mapping service. In such embodiments, users viewing a map displayed on an electric vehicle 900, other user device 620 or vehicle device 622 may select to view an overlay or integrated display of risk data. Examples of such a view are provided and discussed further below in conjunction with FIG. 8. In this way, users may view, plan, and create routes appropriate for an electric vehicle.

Pursuant to some embodiments, data may be transmitted between devices using a wireless network. In some embodiments, some, or all, of the data may be transmitted using other network communication techniques (e.g., such as satellite communication, RFID, or the like). In some embodiments, some or all of the data transmitted between devices may be encrypted or otherwise secured to prevent intrusion.

Figure 7:
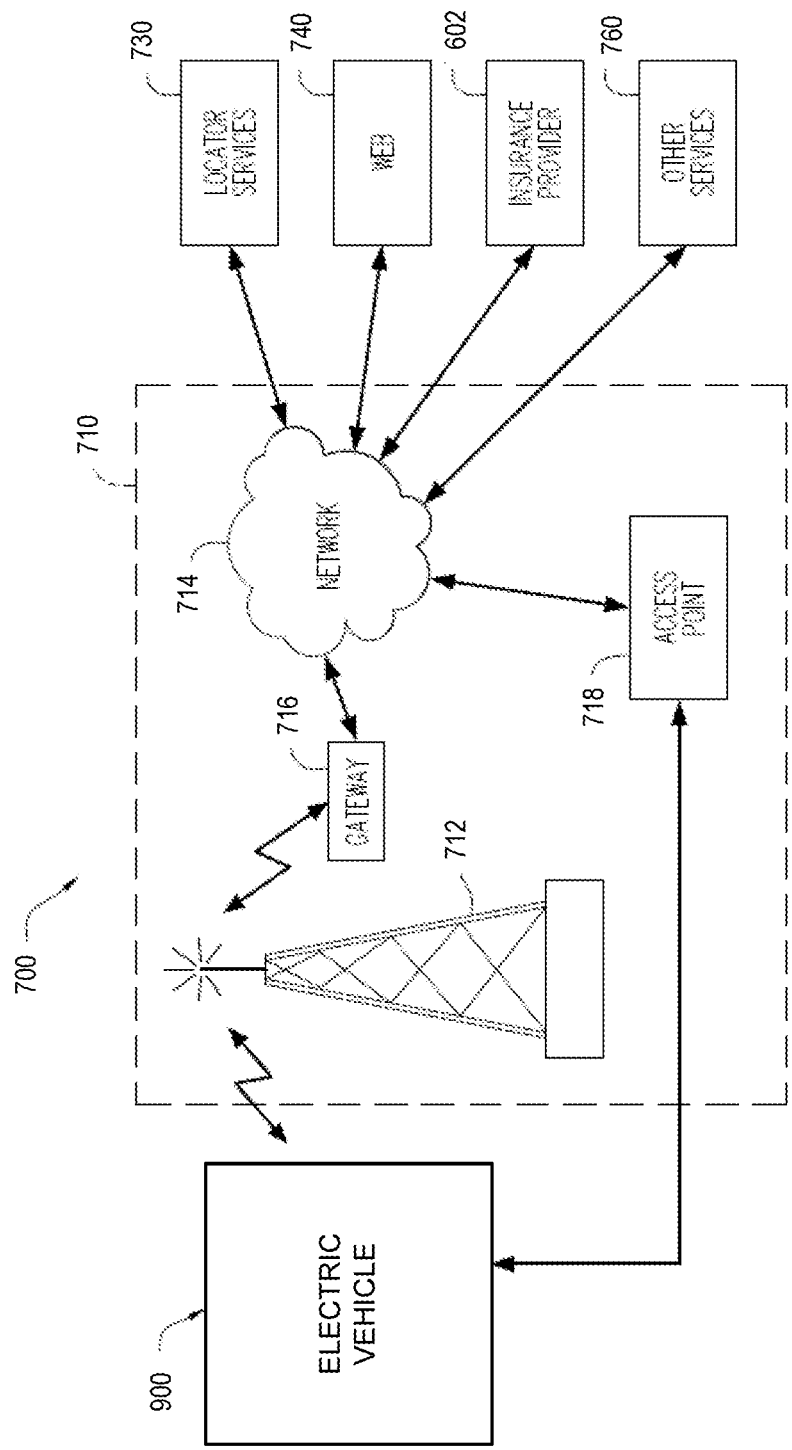
FIG. 7 illustrates an electric vehicle system architecture within which some embodiments may be implemented.

Reference is now made to FIG. 7, which is a block diagram of an example network environment 700 showing communication paths between an electric vehicle 900 and the insurance processing systems 602 (as well as other devices and data sources). The electric vehicle 900 may be, for example, any type of hybrid and/or battery operated automobile.

The electric vehicle 900 of FIG. 7 can, for example, communicate over one or more wired and/or wireless networks 710. As an example, a wireless network can be a cellular network (represented by a cell transmitter 712). A electric vehicle 900 may communicate over a cellular or other wireless network and through a gateway 716 may then communicate with a network 714 (e.g., such as the Internet or other public or private network). An access point, such as access point 718 may be provided to facilitate data and other communication access to network 714. The access point 718 may be, for example, compliant with the 802.11g (or other) communication standards.

In some embodiments, electric vehicle 900 may engage in both voice and data communications over the wireless network 712 via access point 718. For example, the electric vehicle 900 may be able to place or receive phone calls, send and receive emails, send and receive short message service ("SMS") messages, send and receive email messages, access electric documents, send and receive streaming media, or the like, over the wireless network through the access point 718. Similar communications may be made via the network 712.

In some embodiments, an electric vehicle 900 may also establish communication by other means, such as, for example, wired connections with charging stations, networks, peer-to-peer communication with other devices (e.g., using Bluetooth networking or the like), etc.

The electric vehicle 900 can, for example, communicate with one or more services over the networks 710, such as service providers 730-260 and the insurance processing systems 602 (described above in conjunction with FIG. 6). For example, a locator service 730 may provide navigation information, e.g., map information, location information, route information, and other information, to the electric vehicle 900.

Other services may include, for example, other web-based services 740 (e.g., such as data services or the like), media services (e.g., providing photo, video, music, or other content), download services (e.g., allowing applications and software or the like to be downloaded, etc.), and insurance services, such as the insurance services described further below (and including, for example, insurance reporting, driver service, underwriting, issuance, and the like).

For example, in some embodiments described herein, the electric vehicle 900 may interact with insurance processing system 602 (of FIG. 6) to receive data associated with loss risk data generated by the scoring engine 604 (of FIG. 6) including the Loss Risk Scores associated with a charging station. The electric vehicle 900 may receive the loss risk data and/or information about charging stations and integrate the data with a map (e.g., as shown and described herein in conjunction with FIG. 8) to allow route planning or driving in view of available charging stations. The electric vehicle 900 may also operate to transmit insurance-related data or driving data to the insurance processing system 602. For example, in a situation where the operator of the electric vehicle 900 is insured by the insurance company operating or associated with the insurance processing system 602, charging information might be reported by the electric vehicle 900.

A number of pricing formulas may be used to incorporate the loss risk scores (described above) into a pricing determination. For example, in one illustrative embodiment, the following formula may be used:

Price=Factor $A$×Factor $B$×Factor $C$×Factor $D$×Factor $E$×Base Rate

Where the Factor (x) is a number between 1.00 and 1.99 calculated from a formula using a defined set of Factor Inputs. The Factor Inputs are pre-defined rating variables from a table of different classifications. The Base Rate is a monetary number used for a unit of risk coverage (e.g., Base Rate for electric vehicles in State of New York or Base Rate for all private passenger vehicles in State of New York). The unit of risk coverage for a particular Base Rate could be for a broad set unit of time and place (year, state). Pursuant to some embodiments, as risk data may be received substantially in real time or on a regular basis, the unit of risk coverage for a particular Base Rate could be much more granular thanks to the dynamically changing data. For example, the unit of risk coverage could be expressed as a base rate per minute, and/or a base rate per mile, or base rate per geocode of the charging station last visited by the electric vehicle.

In the example pricing formula shown above, a number of Factor Inputs may be used, including, for example, those shown in the Table 1 below.

TABLE 1

| Factor Inputs | Type of Factor |
| --- | --- |
| Person Risk Score (based on Trip Risk Score) | E (non traditional) |
| Vehicle Risk Score (based on Trip Risk Score) | E (non traditional) |
| Credit Score (where legally available) | A |
| Age | A |
| # of at fault accidents | A |
| # of not at fault accidents | A |
| # of accident violations | A |
| # of passenger vehicles owned | A |
| Have prior insurance | B |
| Months since last auto accident | B |
| Months since last comprehensive loss on policy | B |
| Annual Mileage | B |
| Years with Insurance Firm | B |
| Years of owning residence | B |
| Years with clean driving record | B |
| Marital Status | C |
| Gender | C |
| Vehicle Age | C |
| Annual Mileage | C |
| Vehicle Use | C |
| Safe Driver Program | C |
| Non resident student | D |
| Air Bag Safety Discount | D |
| Anti Theft Device | D |
| Mature operator vehicle safety course | D |
| Own hybrid vehicle | D |
| Registered Mobile GPS device | D |

These pricing factors, as well as the risk scoring criteria discussed herein, are provided for illustrative purposes. The factors and criteria used in conjunction with any given insurer or product will be selected and used in a manner that is in conformance with any applicable laws and regulations. Pursuant to some embodiments, more granular pricing may be achieved by using several "non-traditional" pricing factors, including the Person Risk Score and the Electric Vehicle Risk Score generated by the scoring engine of the present invention. Further, because the data may be obtained based on actual usage patterns obtained from an electric vehicle 900 (or from charging stations, in some embodiments), the pricing may accurately reflect the actual loss risk associated with the usage patterns of a particular driver or electric vehicle.

Figure 8:
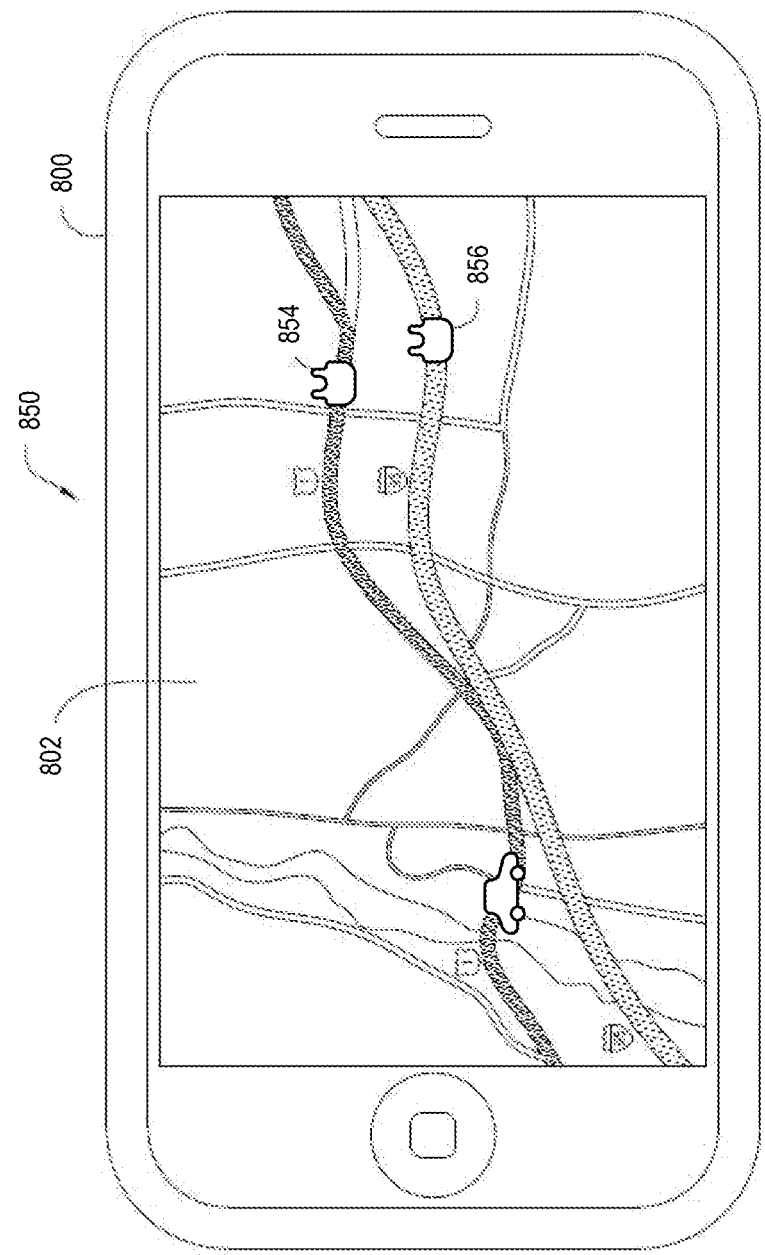
FIG. 8 is a block diagram depicting a user interface pursuant to some embodiments.

Referring now to FIG. 8, a diagram 850 depicting a user interface 802 is shown. The user interface 802 may be displayed on device 800 such as a mobile telephone, PDA, personal computer, or the like. For example, the mobile device 800 may be an IPHONE® telephone from Apple, Inc., a BLACKBERRY® telephone from RIM, a mobile phone using the Google ANDROID® operating system, or the like. The user interface 802 depicts a portion of a map showing a portion of Fairfield County in the State of Connecticut. The user interface 852 may display the location of charging stations 854, 856 to a driver of an electric vehicle.

In some embodiments, such as the one depicted in FIG. 8, users operating devices such as an electric vehicle 900, may access risk score information in order to identify a safe route or to assess the relative risk associated with different routes and/or charging stations. For example, Trip Risk Score maybe generated for each of the multiple route options. As shown in FIG. 8, a user is viewing a portion of a route map. In the illustrative interface, the user is viewing a route through Fairfield County Conn., and has two route choices—a surface street (shown as Route "1") with a first charging stations 454 or a freeway (shown as Interstate "95") with a second charging station 456. The relative level of loss risk posed between the two routes and charging stations is depicted by shading or coloring. In the illustrative example, the choice of Route 1 (shown as item 454) is shaded darker than the alternative route (shown as item 456). The darker shading may indicate that the surface street (which traverses a downtown area with multiple traffic issues and intersections) has a higher risk of loss for electric vehicles than the alternative route. In this manner, drivers operating electric vehicles 900 may proactively choose to take routes that have lower risk of vehicle damage, passenger injury, or other losses.

Figure 9:
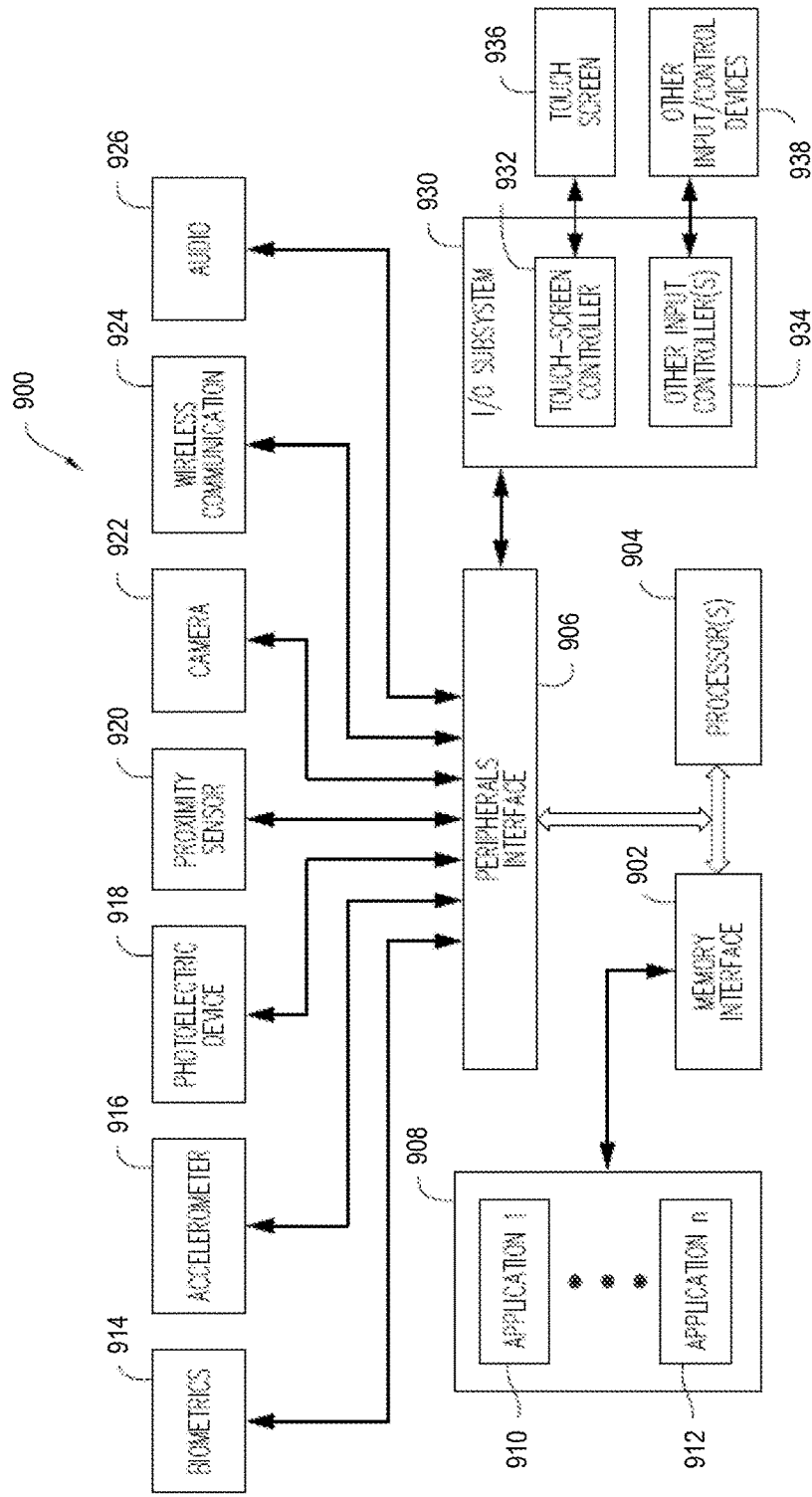
FIG. 9 is a partial functional block diagram of an electric vehicle and system provided in accordance with some embodiments.

Reference is now made to FIG. 9, where details of an electric vehicle 900 according to some embodiments are shown. As depicted, the electric vehicle 900 includes a number of components which may be controlled or perform functions in conjunction with one more application programs 910-912 to perform the features of some embodiments.

The electric vehicle 900 can include a memory interface 902 one or more data processors, image processors and/or central processing units 904, and a peripherals interface 906. The memory interface 902, the one or more processors 904 and/or the peripherals interface 906 can be separate components or can be integrated in one or more integrated circuits. The various components in the electric vehicle 900 can be coupled by one or more communication buses or signal lines.

Sensors, devices and subsystems can be coupled to the peripherals interface 906 to facilitate multiple functionalities. For example, a biometrics sensor 914, an accelerometer 916, a photoelectric device 918, a proximity sensor 920, a camera 922, a wireless communication unit 924, and an audio unit 926 may be provided to facilitate the collection, use and interaction with data and information and to achieve the functions of the insurance applications described further below.

The electric vehicle 900 may include one or more input/ output (I/O) devices and/or sensor devices. For example, input controllers 934 may be provided with a speaker and a microphone (not shown) to facilitate voice-enabled functionalities, such as phone and voice mail functions. In some implementations, a loud speaker can be included to facilitate hands-free voice functionalities, such as speaker phone functions. An audio jack can also be included for use of headphones and/or a microphone.

The I/O subsystem 930 can include a touch screen controller 932 and/or other input controller(s) 934. The touch-screen controller 932 can be coupled to a touch screen 936. The touch screen 936 and touch screen controller 932 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 936.

The other input controller(s) 934 can be coupled to other input/control devices 938, such as one or more buttons, rocker switches, thumb-wheel, infrared port, USB port, and/or a pointer device such as a stylus. The one or more buttons (not shown) can include an up/down button for volume control of the speaker and/or the microphone. In some implementations, a proximity sensor 920 can be included to facilitate the detection of the electric vehicle 900 proximate to an electric vehicle charging station.

Other sensors can also be used. For example, in some implementations, a photoelectric device 918 may be provided to facilitate adjusting the brightness of the touch-screen display 938. In some implementations, an accelerometer 916 can be utilized to detect movement of the electric vehicle 900. In some embodiments, the electric vehicle 900 may include circuitry and sensors for supporting a location determining capability, such as that provided by the global positioning system (GPS) or other positioning system (e.g., electric charging station systems using Wi-Fi access points, television signals, cellular grids, Uniform Resource Locators (URLs)). In some implementations, a positioning system (e.g., a GPS receiver) can be integrated into the electric vehicle 900 or provided as a separate device that can be coupled to the electric vehicle 900 through a peripherals interface 906 to provide access to location-based services. The positioning and location-based services may be used, for example, to tag data transmitted from the electric vehicle 900 to insurance provider systems 102 (either directly or though a charging station or mobile payment device or provider). The electric vehicle 900 can also include a camera lens and sensor 922.

The electric vehicle 900 can also include one or more wireless communication subsystems 924, such as an 802.11b/g communication device, and/or a BLUETOOTH® Bluetooth® communication device to exchange information with an electric charging station. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc. In some implementations, additional sensors or subsystems may be coupled to the peripherals interface 906 via connectors such as, for example a Universal Serial Bus (USB) port, or a docking port, or some other wired port connection.

The memory interface 902 can be coupled to memory 908. The memory 908 can include high-speed random access memory and/or non-volatile memory, such as one or more magnetic disk storage devices, one or more optical storage devices, and/or flash memory (e.g., NAND, NOR). The memory 908 can store an operating system, such as DARWIN operating system, RTXC operating system, LINUX operating system, UNIX operating system, OS X operating system, WINDOWS operating system, or an embedded operating system such as VXWORKS operating system. The operating system may include instructions for handling basic system services and for performing hardware dependent tasks. In some implementations, the operating system can be a kernel (e.g., UNIX kernel).

The memory 908 may also store application programs 910-912 which act, in conjunction with the processors 904, to cause the electric vehicle to operate to perform certain functions, including the insurance related functions described further below.

The memory 908 can also store data, including but not limited to documents, images, video files, audio files, and other data. In some implementations, the memory 908 stores a vehicle identifier and address book data, which can include contact information (e.g., address, phone number, etc.) for one or more persons, organizations, services, or entities. For example, in some embodiments, the memory stores insurance policy numbers or other unique identifiers to allow a user of the electric vehicle 900 to quickly access insurance policy related data and information.

Figure 10:
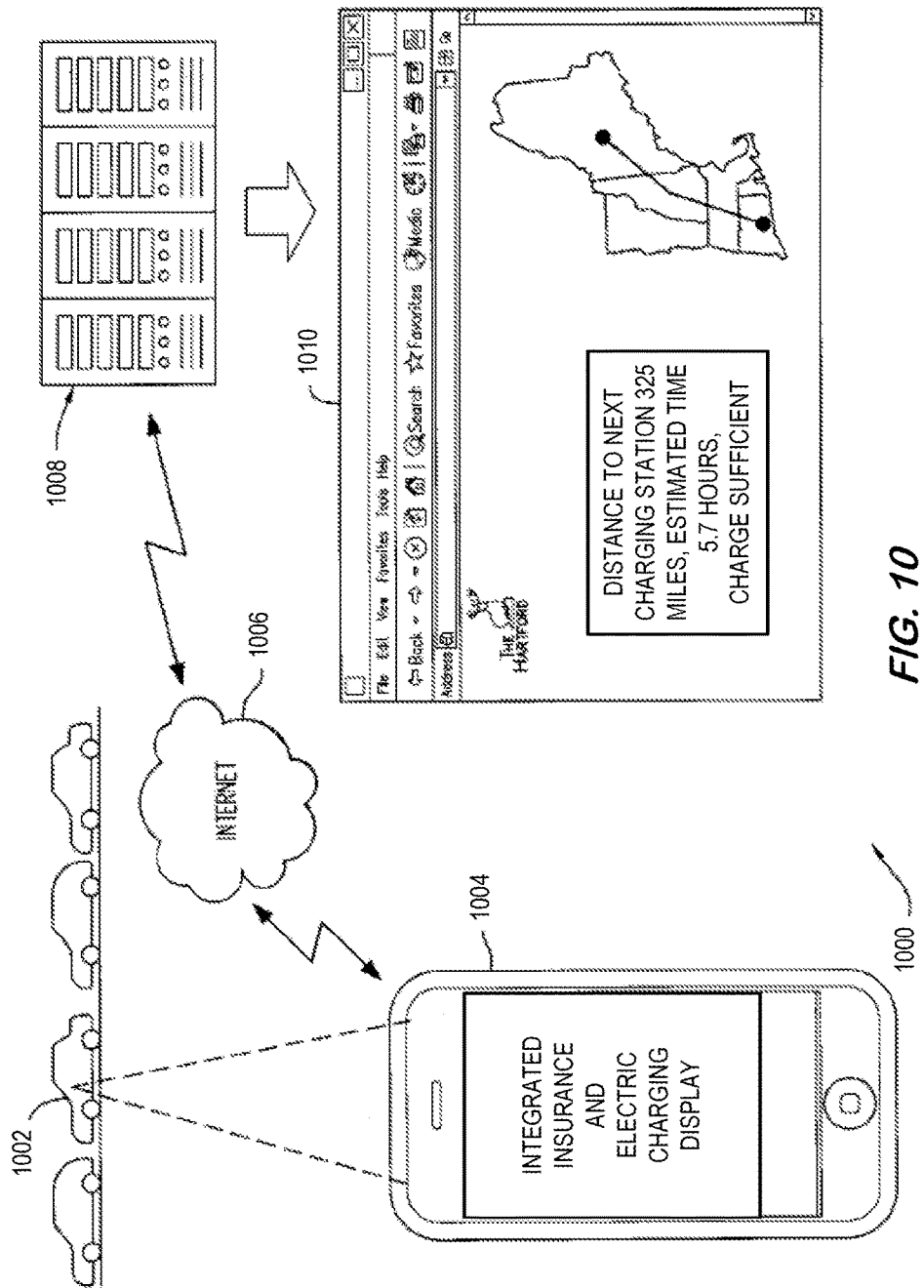
FIG. 10 is a block diagram depicting an electric vehicle information system pursuant to some embodiments.

Reference is now made to FIG. 10 where a system 1000 is shown in which a driver of an electric vehicle 1002 (e.g., at a charging station) is operating a mobile device 1004 on which an insurance application pursuant to the present invention is installed. The driver can access an integrated insurance and electric charging display on the mobile device 1004. The information is received at the mobile device 1004 from an insurance or other processing system 1008 via a network 1006. According to some embodiments, the information may instead be displayed via the electric vehicle 1002 itself or a charging station meter. Note that information displayed to the driver could also include marketing information, entertainment information, etc. The processing system 1008 may, according to some embodiments, be associated with an insurance provider. According to some embodiments information associated with the electric vehicle 1002 may also be accessible via a web page 1010.

According to some embodiments, social network information may be automatically updated when a driver accesses a charging station. For example, a message might be posted on a FACEBOOK® social network service profile indicating that the driver has saved a certain amount of money or obtained a particular environmental benefit by charging his or her vehicle. As another example, a TWITTER® social network service account might be automatically updated to help other users of a shared community vehicle determine the current location of the vehicle.

Figure 11:
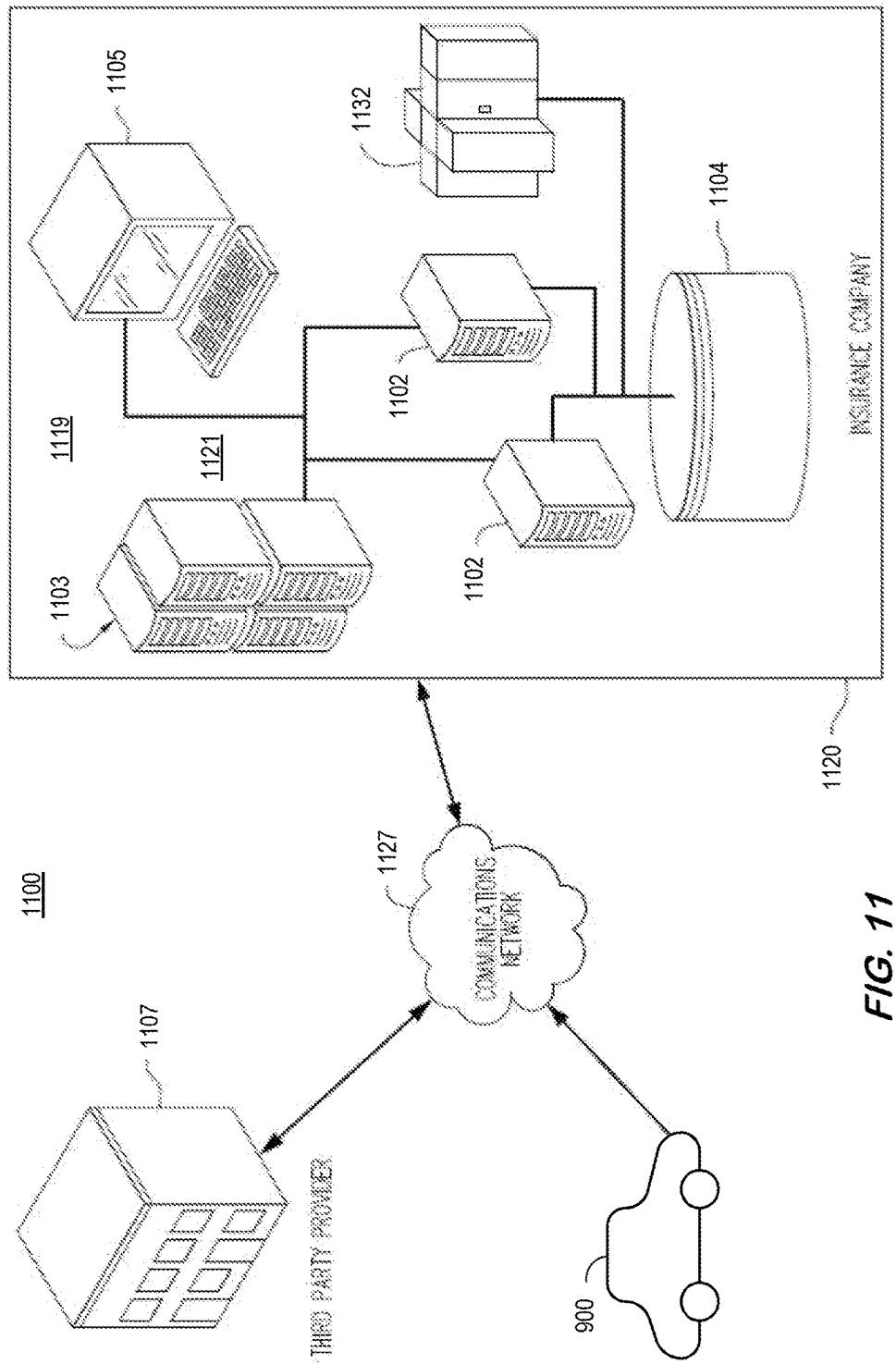
FIG. 11 is a block diagram of an insurance system pursuant to some embodiments.

FIG. 11 is a schematic diagram of a system 1100 for monitoring, evaluating, and providing information about insurance and/or an electric vehicle 900. In FIG. 11, insurance company 1120 provides a driver with insurance coverage. The type of insurance provided by insurance company 1120 may be any type of insurance, such as general liability insurance, although the present invention is described primarily in terms of automobile insurance. Insurance company 1120 can simultaneously provide services to multiple drivers, although only one electric vehicle 900 is shown in FIG. 11 for clarity.

According to some embodiments, the electric vehicle 900 itself may execute an application and provide information to a drive (e.g., via a dashboard display of integrated insurance and charging information). According to other embodiments, a mobile device or may store an application program that may be loaded onto the mobile device from an insurance company or from an application repository (e.g., such as Apple's App Store or the like). In still other embodiments, a terminal or screen at a charging station may execute an insurance related application.

In any of those cases, when launched, an application may prompt the driver for information used to interact with the insurance company 1120. A variety of different types of data and information may be provided from application to the insurance company 1120, including static data regarding the driver such as the driver's user name, password, policy information, etc. The data from mobile device 1130 is transmitted via communications network 1127 to insurance company 1120 for evaluation and processing. A third party provider 1107 can also be a source of information associated with drivers and policies.

The insurance company 1120 has a computer system 1119 that includes application servers 1102, load balancing proxy servers 1103, data storage unit 1104, business logic computer 1122, and user interface module 1105 to perform electric vehicle insurance functions and/or risk evaluation based on the collected data. Employees of the insurance company 1120 and other authorized personnel use user interface module 1105 to access the insurance company computer system. User interface module 1105 may be any type of computing device that is configured to communicate with other computer systems. User interface module 1105 may be connected directly to application server 1102, or may access an application server 1102 via the load balancing proxy servers 1103. User interface module 1105 may connect to load balancing proxy servers 1103 via a local area network, a private data link, or via the internet. Although depicted as being part of insurance company 1120 in FIG. 11, user interface module 1105 may be located remotely. The business logic computer 1122 is connected to the data storage unit 1104 and application servers 1102 over a local area network 1121, which may be part of communication system 1127. In addition, other network infrastructure, including, for example a firewall, backup servers, and back up data stores, may also be included in the system 1119, without departing from the scope of the invention. Communications over the local area network 1121 and/or over the Internet, in one implementation, may be encrypted. In addition, such communications, whether encrypted or not, may also be digitally signed for authenticating the source of the communications. The computer system 1119 may also include a certificate authority to authenticate one or more of the communications using public key infrastructure.

Based on data collected from the mobile device 1130, charging station, and/or any third party data sources, an evaluation module may analyze and evaluate data associated with the electric vehicle 900. As used herein, a "module" may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electric signals on a system or network. In addition, entire modules, or portions thereof, may also be implemented in programmable hardware devices such as field programmable gate arrays, programmable array logic, programmable logic devices or the like or as hardwired integrated circuits.

A business logic module, implemented preferably in business logic computer 1122, is used correlate and track charging information and/or perform risk analysis associated with the electric vehicle 900 based on the received data. The business logic module may use predictive models, such as neural networks, Bayesian networks, and support vector machines, in performing any underwriting and premium adjustments. In one embodiment, the premium of an insurance policy is increased or decreased if data received from the electric warrants. Instead of altering premium rates, other terms of the insurance policy can be altered, such as the policy deductible. In some embodiments, the premiums may be increased or decreased based on charging information associated with the electric vehicle 900. Further still, rates may depend on one or more loss risk scores calculated by the scoring engine 604 described in conjunction with FIG. 6.

In another scenario, insurance company 1120 awards a driver of the electric vehicle 900 with premium discounts, or other advantageous rewards, simply for operating certain insurance applications as described herein. Insurance company 1120 may award different discounts depending on the nature and amount of data provided by driver and/or charging stations.

In one implementation, software operating on the application servers 1102 act merely as presentation and data extraction and conversion servers. All substantive business logic, including underwriting and pricing determinations, is carried out on the business logic computer 1122. In this implementation, the application servers 1102 obtain data from the data storage unit 1104 and the business logic computer 1122 and incorporate that data into web pages (or other graphical user interface formats). These web pages are then communicated by the application servers 1102 through the load balancing proxy servers 1103 to user interface module 1105 for presentation. Upon receiving input from user interface module 1105, the application server 1102 translates the input into a form suitable for processing by the business logic computer 1122 and for storage by the data storage unit 1104. In this implementation, the application servers can be operated by third parties, who can add their own branding to the web pages or add other customized presentation data. In the alternative, at least some of the business logic is also carried out by the application servers 1102. Application servers 1102 may also include a webserver for automatically recovering or retrieving data from local computer 1133.

In another implementation, the application servers 1102 are software modules operating on one or more computers. One of the computers on which the application servers 1102 are operating may also serve as the business logic computer 1122 and/or as a load balancing proxy server 1103.

In other implementations, the software operating on user interface module 1105 includes a thin or thick client application in addition to, or instead of web browser. The thin or thick client application interfaces with a corresponding server application operating on the application server 1102.

Figure 12:
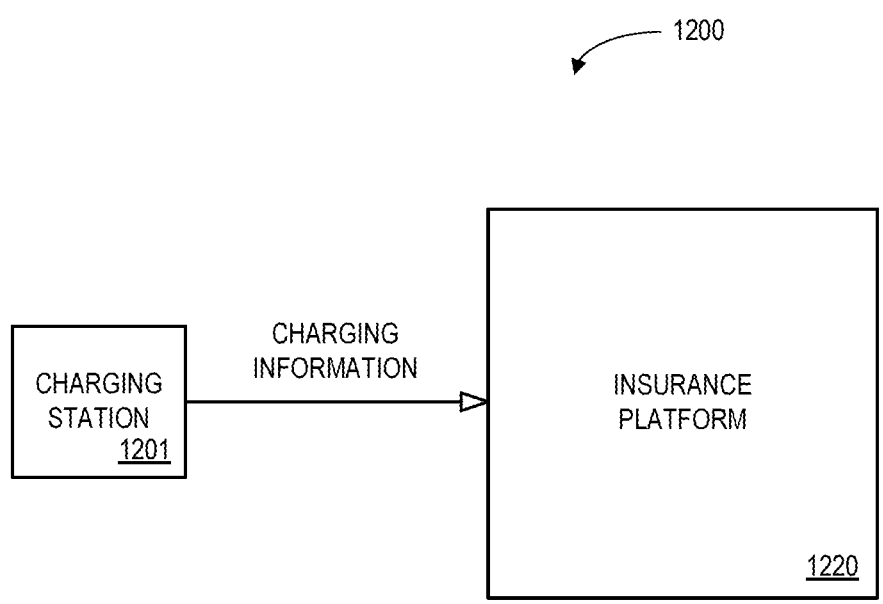
FIG. 12 is a block diagram of an insurance system pursuant to some embodiments.

FIG. 12 is a schematic diagram of an illustrative electric vehicle system 1200 where a driver (operating an electric vehicle at a charging station 1201) is insured by insurance company 1220. As the driver charges his or her electric vehicle, the charging station 1201 transmits transmit data to the insurance company 1220.

The insurance company may perform, for example, a premium analysis which includes activities that potentially affect a driver's premium, deductible amount, discounts or credits, as well as large scale analysis to provide input into industry or occupation experience factors. The determination of premium and offering of discounts or credits may be performed once at underwriting time, regularly on an interval, continuously, in response to an event, or retroactively, as permitted by local, state, and/or federal regulations.

The analysis and decisions made by insurance company 1220 with regard to premium/service adjustments may be transmitted back to driver via the charging station 1201, a mobile device, and/or the electric vehicle itself. Insurance company 1220 may save the data and reports received from the charging station 1201, and the decisions that were made based upon them, in a data storage unit associated with the insurance company 1220 or in a separate data warehouse. This archived data may be used for future retrospective analysis, claims adjudication, and/or to support fraud investigation.

Thus, embodiments of the present invention may provide information to electric vehicle drivers and/or owners to reassure them regarding some of the new aspects associated with the technology. Moreover, more accurate and current data about an electric vehicle may be transmitted to an insurance provider and/or to a driver or owner of the electric vehicle. Further still, some embodiments may monitor or identify driving patterns associated with certain electric vehicle drivers to allow those drivers to receive discounts or other benefits based on desirable charging patterns.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems).

Applicants have discovered that embodiments described herein may be particularly useful in connection with electric vehicles. Note, however, that other types of alternative fuel vehicles may also benefit from the invention. For example, embodiments of the present invention may be used in connection with hydrogen powered vehicles.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system, comprising:
   a data storage device storing: automobile payment-related data, including an amount due and a due date; data indicative of one or more past electric charge dates, past times and amounts of electric charge for an electric vehicle, and data indicative of upcoming maintenance, including a date and maintenance type, for an electric vehicle; a communications device in communication via a communications network with at least a user-accessible device and a mobile payment device; a memory storage device storing processor-executable instructions; one or more processors in communication with the data storage device, the communications device and the memory storage device, the instructions causing the one or more processors to: receive electric vehicle information, including electric vehicle charging information, including an amount of electric charge provided for the electric vehicle, a geographic location of an electric vehicle charging station, and a date and time of the charging, and identifier information for at least one of the electric vehicle and the mobile payment device, from the mobile payment device, via the communications device; associate, using the identifier information, the electric vehicle charging information with the automobile-related payment data stored in the data storage device;

generate data indicative of an integrated presentation of at least a portion of the electric vehicle charging information, including the amount of electric charge provided for the electric vehicle, the geographic location of the electric vehicle charging station and the date and time; the automobile-related payment data, including the amount due and the due date; the data indicative of one or more past electric charge dates, times and amounts of electric charge; and the data indicative of upcoming maintenance, including the date and maintenance type, for the electric vehicle; and provide the data indicative of the integrated presentation of the at least the portion of the electric vehicle charging information, including the amount of electric charge provided for the electric vehicle, the geographic location of the electric vehicle charging station and the date and time of the charging, the automobile-related payment data, including the amount due and the due date; the data indicative of one or more past electric charge dates, times and amounts of electric charge; and the data indicative of upcoming maintenance, including the date and maintenance type, for the electric vehicle to the communications device for transmission via the communications network to the user-accessible device to cause the user-accessible device to display the integrated presentation on a single screen; and a mobile payment device configured to, responsive to a swiping interaction with a public electric vehicle charging station, initiate a payment for electric charge at the public electric vehicle charging station and automatically initiate a payment for the automobile-related payment, and responsive to a different swiping interaction with a private electric vehicle charging station of an owner of the electric vehicle, automatically initiate a payment for the automobile-related payment;

wherein the mobile payment device is further configured to receive location information from a positioning system of the electric vehicle, and to receive the amount of electric charge provided for the electric vehicle and the date and time, and provide the received electric vehicle information to the communications device.

2. The system of claim 1, wherein the instructions causing the one or more processors to provide the data indicative of the integrated presentation for transmission comprises causing the one or more processors to provide the data for transmission to one of an electric vehicle charging station, an electric vehicle, a mobile payment device, and a communication address of the owner of the electric vehicle.

3. The system of claim 1, wherein the automobile-related payment data includes automobile insurance data including data collected by one or more of a positioning system and one or more sensors coupled to the electric vehicle, the one or more sensors comprising one or more of a biometrics sensor, an accelerometer, a photoelectric device, a proximity sensor, and a camera, and data indicative of one or more evaluations based on the data collected by the one or more of a positioning system and one or more sensors coupled to the electric vehicle, and the instructions causing the one or more processors to generate data indicative of the integrated presentation comprises causing the one or more processors to incorporate one or more of the collected data and data indicative of the one or more evaluations, in the data indicative of the integrated presentation.

4. A computer-implemented method, comprising: receiving, by one or more computer processors, from a mobile payment device, via a communications device, electric vehicle information, including electric vehicle charging information, including an amount of electric charge provided for the electric vehicle, a geographic location of an electric vehicle charging station and a date and time of the charging, and identifier information for the electric vehicle; associating, by the one or more computer processors, using the identifier information, the electric vehicle charging information with automobile-related payment data, including an amount due and a due date; data indicative of one or more past electric charge dates, times and amounts of electric charge for the electric vehicle, and data indicative of upcoming maintenance, including a date and maintenance type, for the electric vehicle, stored in a data storage device in communication with the one or more computer processors; generating, by the one or more computer processors, data indicative of an integrated presentation of at least a portion of the electric vehicle charging information, including the amount of electric charge provided for the electric vehicle, the geographic location of the electric vehicle charging station and the date and time of the charging; the automobile-related payment data, including the amount due and the due date; the data indicative of one or more past electric charge dates, times and amounts of electric charge; and the data indicative of upcoming maintenance, including the date and maintenance type, for the electric vehicle; providing, by the one or more computer processors the data indicative of the integrated presentation of the at least the portion of the electric vehicle charging information, including the amount of electric charge provided for the electric vehicle, the geographic location of the electric vehicle charging station and the date and time of the charging; the automobile-related payment data, including the amount due and the due date; the data indicative of one or more past electric charge dates, times and amounts of electric charge; and the data indicative of upcoming maintenance, including the date and maintenance type, for the electric vehicle to the communications device; transmitting, by the communications device, via a communications network, the data indicative of the integrated presentation, to a user-accessible device to cause the user-accessible device to display the integrated presentation on a single screen; effecting, by the mobile payment device, responsive to a swiping interaction with an electric vehicle charging station, initiation of a payment for the automobile-related payment, wherein, responsive to the electric vehicle charging station being a public electric vehicle charging station, initiation of a payment for electric charge at the public electric vehicle charging station is also initiated and; wherein the electric vehicle charging station is a private electric vehicle charging station of an owner of the vehicle, automatically initiating only a payment for the automobile-related payment; and by the mobile payment device, receiving location information from a positioning system of the electric vehicle, and receiving the amount of electric charge provided for the electric vehicle and the date and time, and providing the received location information and electric charge amount, date and time, to the communications device.

5. The computer-implemented method of claim 4, wherein the providing the data indicative of the integrated presentation for transmission comprises providing the data for transmission to one of an electric charging station, an electric vehicle, a mobile payment device, and a communication address of the owner of the electric vehicle.

6. The computer-implemented method of claim 4, further comprising storing by the data storage device data indicative of one or more past electric charge dates, times and amounts of electric charge, and the generating data indicative of the integrated presentation comprises incorporating data indicative of the one or more past electric charge dates, times and amounts of electric charge in the data indicative of the integrated presentation.

7. A system, comprising: a non-transitory computer-readable storage medium, having computer-readable instructions stored thereon, which instructions, when executed by one or more processors, cause the one or more processors to: receive electric vehicle information, including electric vehicle charging information, including an amount of electric charge provided for the electric vehicle, a geographic location of an electric vehicle charging station and a date and time of the charging, and identifier information for at least one of the electric vehicle and a mobile payment device, from the mobile payment device, via a communications device; associate, using the identifier information, the electric vehicle charging information with automobile-related payment data, including an amount due and a due date; data indicative of one or more past electric charge dates, times and amounts of electric charge for an electric vehicle, and data indicative of upcoming maintenance, including a date and maintenance type, for an electric vehicle, stored in a data storage device; generate data indicative of an integrated presentation of at least a portion of the electric vehicle charging information, including the amount of electric charge provided for the electric vehicle, the geographic location of the electric vehicle charging station and the date and time of the charging; the automobile-related payment data, including the amount due and the due date; the data indicative of one or more past electric charge dates, times and amounts of electric charge; and the data indicative of upcoming maintenance, including the date and maintenance type, for the electric vehicle; and provide the data indicative of the integrated presentation of the at least the portion of the electric vehicle charging information, including the amount of electric charge provided for the electric vehicle, the geographic location of the electric vehicle charging station and the date and time of the charging; the automobile-related payment data, including the automobile insurance premium amount due and the due date; the data indicative of one or more past electric charge dates, times and amounts of electric charge; and the data indicative of upcoming maintenance, including the date and maintenance type, for the electric vehicle to the communications device for transmission via a communications network to a user-accessible device to cause the user-accessible device to display the integrated presentation on a single screen; and a mobile payment device configured to, responsive to a swiping interaction with a public electric vehicle charging station, initiate a payment for electric charge at the public electric vehicle charging station and automatically initiate the automobile-related payment; and, responsive to interaction with a private electric vehicle charging station of an owner of the vehicle, automatically initiate the automobile-related payment; wherein the mobile payment device is further configured to receive location information from a positioning system of the electric vehicle, and to receive the amount of electric charge provided for the electric vehicle and the date and time, and provide the received location information, amount of electric charge and date and time to the communications device.

8. The system of claim 7, wherein the instructions stored on the non-transitory computer-readable medium causing the one or more processors to provide the data indicative of the integrated presentation for transmission comprises causing the one or more processors to provide the data for transmission to one of an electric vehicle charging station, an electric vehicle, a mobile payment device, and a communication address of the owner of the electric vehicle.

* * * * *